United States Patent
Liu et al.

(10) Patent No.: US 9,414,039 B2
(45) Date of Patent: Aug. 9, 2016

(54) INFORMATION PROCESSING METHOD AND INFORMATION PROCESSING DEVICE

(71) Applicant: LENOVO (BEIJING) CO., LTD., Haidian District, Beijing (CN)

(72) Inventors: Yonghua Liu, Beijing (CN); Yuru Jin, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 65 days.

(21) Appl. No.: 14/229,042

(22) Filed: Mar. 28, 2014

(65) Prior Publication Data
US 2015/0049214 A1 Feb. 19, 2015

(30) Foreign Application Priority Data
Aug. 14, 2013 (CN) .......................... 2013 1 0353856

(51) Int. Cl.
*H04N 9/806* (2006.01)
*H04N 5/765* (2006.01)
*H04N 5/77* (2006.01)
*H04N 9/82* (2006.01)

(52) U.S. Cl.
CPC ............. *H04N 9/8063* (2013.01); *H04N 5/765* (2013.01); *H04N 5/772* (2013.01); *H04N 9/8205* (2013.01)

(58) Field of Classification Search
CPC . H04N 5/92; H04N 5/23293; H04N 2101/00; H04N 9/8063; H04N 5/9201
See application file for complete search history.

(56) References Cited

U.S. PATENT DOCUMENTS

2006/0187338 A1* 8/2006 May et al. ...................... 348/375
2008/0068456 A1* 3/2008 Fujii et al. ..................... 348/130

* cited by examiner

*Primary Examiner* — Ahmed A Berhan
(74) *Attorney, Agent, or Firm* — Brinks Gilson & Lione; G. Peter Nichols

(57) ABSTRACT

An information processing method and device applied to an electronic device are provided. The electronic device includes a first collecting unit located on a first surface and a second collecting unit located on a second surface. The method includes detecting a first input; outputting a first media data collected by the first collecting unit when the first input satisfies a first predetermined condition; detecting a second input; and switching the output into a second media data collected by the second collecting unit when the second input satisfies a second predetermined condition, wherein the first media data and the second media data have the same media type, the first media data corresponds to a first collecting time parameter, the second media data corresponds to a second collecting time parameter, and the first collecting time parameter is the same as the second collecting time parameter.

5 Claims, 7 Drawing Sheets

INFORMATION PROCESSING METHOD AND INFORMATION PROCESSING DEVICE

BACKGROUND

This application claims priority to Chinese patent application No. 201310353856.2 filed on Aug. 14, 2013, the entire contents of which are incorporated herein by reference.

The present disclosure relates to the field of information processing, and particularly to an information processing method and an information processing device.

At present, electronic devices with multiple collecting units become more and more popular. The collecting unit may be a sound collecting unit such as a microphone or an image collecting unit such as a camera. A user may perform image or sound collection on the surrounding environment by using one collecting unit among the multiple collecting units typically located on difference surfaces.

SUMMARY

In view of the above situation, the present disclosure provides an information processing method and an information processing device, which can make full use of multiple collecting units of an electronic device to perform collection on the surrounding environment and store the collecting results in association with one another.

In addition, the present disclosure provides an information processing method and an information processing device, which enable the obtained collecting results to be presented in a manner adapted to the user's recognition habit and operation habit. Therefore, a new collecting and storage manner for the electronic device is provided to enrich the user's experience.

According to an embodiment of the present disclosure, there is provided an information processing method applied to an electronic device, the electronic device comprising a first collecting unit located on a first surface and a second collecting unit located on a second surface, the information processing method comprising: detecting a first input; outputting a first media data collected by the first collecting unit when the first input satisfies a first predetermined condition; detecting a second input; and switching the output into a second media data collected by the second collecting unit when the second input satisfies a second predetermined condition, wherein the first media data and the second media data have the same media type, the first media data corresponds to a first collecting time parameter, the second media data corresponds to a second collecting time parameter, and the first collecting time parameter is the same as the second collecting time parameter.

The first media data comprises a first image, the second media data comprises a second image, and the step of switching the output into the second media data collected by the second collecting unit comprises: generating a transitional image representing the switching of the first image to the second image before displaying the second image; and displaying the transitional image.

The step of generating the transitional image comprises: generating a static transitional image or a dynamic transitional image based on the first image and the second image.

The step of generating the transitional image comprises: generating the transitional image with a specific display effect corresponding to the positional relationship between the first surface and the second surface.

The first media data comprises a first audio, and the second media data comprises a second audio; the first audio is obtained directly by the first collecting unit performing collection on the sound environment surrounding the electronic device, and the second audio is obtained directly by the second collecting unit performing collection on the sound environment surrounding the electronic device.

The first media data comprises a first audio, and the second media data comprises a second audio; the first collecting unit performs collection on the sound environment surrounding the electronic device to obtain a first processing audio, the second collecting unit performs collection on the sound environment surrounding the electronic device to obtain a second processing audio, the first audio is obtained through performing noise-reduction processing on the first processing audio by taking the second processing audio as noise, and the second audio is obtained through performing noise-reduction processing on the second processing audio by taking the first processing audio as noise.

The information processing method further comprises: detecting a third input; and switching the output into a third media data when the third input satisfies a third predetermined condition; wherein the third media data is collected by one of the first collecting unit and the second collecting unit, the third media data corresponds to a third collecting time parameter which is different from the first collecting time parameter and the second collecting time parameter.

The step of switching the output into the second media data collected by the second collecting unit comprises: switching the output into the second media data with a first effect; the step of switching the output into the third media data comprises: switching the output into the third media data with a second effect which is different from the first effect.

According to another embodiment of the present disclosure, there is provided an information processing method applied to an electronic device, the electronic device comprising a first collecting unit located on a first surface and a second collecting unit located on a second surface, the information processing method comprising: collecting a first source data by the first collecting unit while collecting a second source data by the second collecting unit; and storing a first target data based on the first source data and a second target data based on the second source data in association with each other; wherein when the electronic device outputs the first target data, it can switch the output into the second target data in response to a second input satisfying a second predetermined condition, or it can switch the output into a third target data which is not associated with the first target data and the second target data in response to a third input satisfying a third condition.

According to another embodiment of the present disclosure, there is provided an information processing device applied to an electronic device, the electronic device comprising a first collecting unit located on a first surface and a second collecting unit located on a second surface, the information processing device comprising: a first detecting unit configured to detect a first input; an output unit configured to output a first media data collected by the first collecting unit when the first input satisfies a first predetermined condition; a second detecting unit configured to detect a second input; and a first switching unit configured to switch the output into a second media data collected by the second collecting unit when the second input satisfies a second predetermined condition, wherein the first media data and the second media data have the same media type, the first media data corresponds to a first collecting time parameter, the second media data corresponds to a second collecting time parameter, and the first collecting time parameter is the same as the second collecting time parameter.

The first media data comprises a first image, the second media data comprises a second image, and the first switching unit comprises: a generation unit configured to generate a transitional image representing the switching of the first image to the second image before displaying the second image; and a display unit configured to display the transitional image.

The generation unit is configured to generate a static transitional image or a dynamic transitional image based on the first image and the second image.

The generation unit is configured to generate the transitional image with a specific display effect corresponding to the positional relationship between the first surface and the second surface.

The information processing device further comprises: a third detecting unit configured to detect a third input; and a second switching unit configured to switch the output into a third media data when the third input satisfies a third predetermined condition; wherein the third media data is collected by one of the first collecting unit and the second collecting unit, the third media data corresponds to a third collecting time parameter which is different from the first collecting time parameter and the second collecting time parameter.

The first switching unit is configured to switch the output into the second media data with a first effect; and the second switching unit is configured to switch the output into the third media data with a second effect which is different from the first effect.

According to another embodiment of the present disclosure, there is provided an information processing device applied to an electronic device, the electronic device comprising a first collecting unit located on a first surface and a second collecting unit located on a second surface, the information processing device comprising: an acquisition unit configured to acquire a first source data by the first collecting unit while acquire a second source data by the second collecting unit; and a storage unit configured to store a first target data based on the first source data and a second target data based on the second source data in association with each other; wherein when the electronic device outputs the first target data, it can switch the output into the second target data in response to a second input satisfying a second predetermined condition, or it can switch the output into a third target data which is not associated with the first target data and the second target data in response to a third input satisfying a third condition.

In the information processing method and the information processing device according to embodiments of the present disclosure, it is enabled to make full use of the collecting capability of multiple collecting units and restore and present the surrounding environment more sufficiently by performing collection on the surrounding environment with multiple collecting units of the electronic device and storing the obtained multiple collecting results in association with one another.

Further, in the information processing method and the information processing device according to embodiments of the present disclosure, the obtained collecting results are presented in a manner adapted to the user's recognition habit and operation habit, which enables the user to perform switching with a natural and single gesture. Therefore, a new collecting and storage manner for the electronic device is provided to enrich the user's experience.

DETAILED DESCRIPTION

In the following, the embodiments of the present disclosure will be described in detail with reference to the accompanying drawings.

First, the information processing method according to an embodiment of the present disclosure will be described.

The information processing method according to an embodiment of the present disclosure is applied to an electronic device such as a portable terminal, a pad computer, etc. The electronic device comprises at least a first collecting unit located on a first surface and a second collecting unit located on a second surface. For example, the first surface and the second surface may be different and opposite to each other. The collecting units may be audio collecting units such as a microphone or image collecting units such as a camera. Taking the image collecting unit as an example, the electronic device may comprise a so called front camera and a so called back camera as the first collecting unit and the second collecting unit respectively. However, the first surface and the second surface may also be the same. Therefore, the first collecting unit and the second collecting unit may be adjacent to each other.

In addition, the electronic device may also comprise an output unit. The output unit may comprise an audio output unit such as a speaker and a video output unit such as a display screen. Further, the electronic device may also comprise a touch input unit such as a touch panel. The touch panel and the display screen may be laminated to form a touch display screen for receiving the touch input from a user and displaying corresponding content.

In the following, the information processing method according to an embodiment of the present disclosure will be described in detail with reference to FIG. 1.

Figure 1:
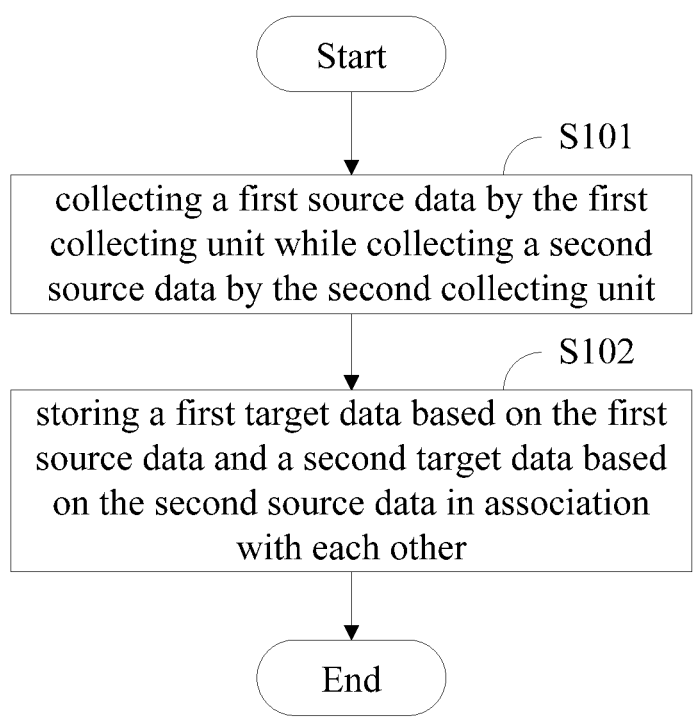
FIG. 1 is a flowchart illustrating the information processing method according to an embodiment of the present disclosure.

As shown in FIG. 1, first, at step S101, the information processing method according to an embodiment of the present disclosure collects a first source data by the first collecting unit while collecting a second source data by the second collecting unit.

In particular, the first media data and the second media data have the same media type. That is, the first collecting unit and the second collecting unit are the collecting units in the same type, for example, they both are audio collecting units or video collecting units. In addition, the first media data corresponds to a first collecting time parameter, the second media data corresponds to a second collecting time parameter, and the first collecting time parameter is the same as the second collecting time parameter. For example, in the case of image collection, the first collecting time parameter and the second collecting time parameter may be collection timing. In the case of audio or video collection, the first collecting time parameter and the second collecting time parameter may be a collection time period.

Next, at step S102, the information processing method stores a first target data based on the first source data and a second target data based on the second source data in association with each other. In particular, the information processing method may associate the first target data with the second target data by a way of linked list, pointer, or the like. Alternatively, the information processing method may attach the same mark to the first target data and the second target data such that two target data with the same mark are associated with each other. In addition, the information processing method may also store the first target data and the second target data in a format supporting multiple data which is different from the format for storing single data such as the JPEG format in the case of image data.

The first target data and the second target data may be directly derived from the first source data and the second source data respectively. Alternatively, the first target data and the second target data may also derived respectively from the first source data and second source data which have experienced various intermediate processing.

In particular, in a first embodiment, the first collecting unit and the second collecting unit are video collecting units. The information processing method takes a first video source data (image data or video data) collected by the first video collecting unit as the first video target data, and takes a second video source data collected by the second video collecting unit as the second video target data. Alternatively, the information processing method may also perform various display processing such as brightness adjusting, size adjusting, display effect adjusting, etc. on the first video source data and the second video source data, and take the processed data as the first video target data and the second video target data respectively.

In a second embodiment, the first collecting unit and the second collecting unit are audio collecting units. The first audio is obtained directly by the first audio collecting unit performing collection on the sound environment surrounding the electronic device, and the second audio is obtained directly by the second collecting unit performing collection on the sound environment surrounding the electronic device. The information processing method takes a first audio source data collected by the first audio collecting unit as the first audio target data, and takes a second audio source data collected by the second audio collecting unit as the second audio target data. Alternatively, the first information processing method may also perform various audio processing such as volume adjusting, length adjusting, audio effect adjusting, etc. on the first audio source data and the second audio source data, and take the processed data as the first audio target data and the second audio target data respectively.

In addition, different from the case of the video collecting units in which different video collecting units such as the front camera and the back camera mentioned above usually only collect images or videos in a specific direction such as front or back of the user, in the case of the audio collecting units, the audio collecting units located in different surfaces may collect not only the sound in the respective directions in which the units are oriented, but also the sound in other directions. Considering this, the information processing method may not only perform various audio processing mentioned above, but also perform noise-reduction processing by using the audio data collected by different audio collecting units.

In particular, the audio which is obtained directly by the first collecting unit performing collection on the sound environment surrounding the electronic device is referred to as a first processing audio, and the audio which is obtained directly by the second collecting unit performing collection on the sound environment surrounding the electronic device is referred to as a second processing audio. On one hand, the information processing method may perform noise-reduction processing on the first processing audio by taking the second processing audio as noise so as to obtain the first audio target data. On the other hand, the information processing method may perform noise-reduction processing on the second processing audio by taking the first processing audio as noise so as to obtain the second audio target data. The details on the noise-reduction processing are known by those skilled in the art, which are omitted herein.

Therefore, in the case that there are sound sources in multiple directions in the environment surrounding the user, for the sound collection in a specific direction, the information processing method may obtain better collecting effect by using the collecting units on different surfaces than by using a single collecting unit, that is, it makes the audio in the specific direction more distinguished and clearer.

According to the above embodiments, the first target data and the second target data are obtained and stored in association with each other. Therefore, when the electronic device outputs the first target data, it may switch the output into the second target data in response to a second input satisfying a second predetermined condition. On the other hand, the electronic device may switch the output into a third target data which is not associated with the first target data and the second target data in response to a third input satisfying a third condition. The switching operation of outputting the first target data and the second target data will be described in detail in connection with FIG. 2 later.

In the above, the information processing method according to an embodiment of the present disclosure is described. In the information processing method according to an embodiment of the present disclosure, it is enabled to make full use of the collecting capability of multiple collecting units and restore and present the surrounding environment more sufficiently by performing collecting on the surrounding environment with multiple collecting units of the electronic device simultaneously and storing the simultaneously obtained multiple collecting results in association with one another.

Figure 2:
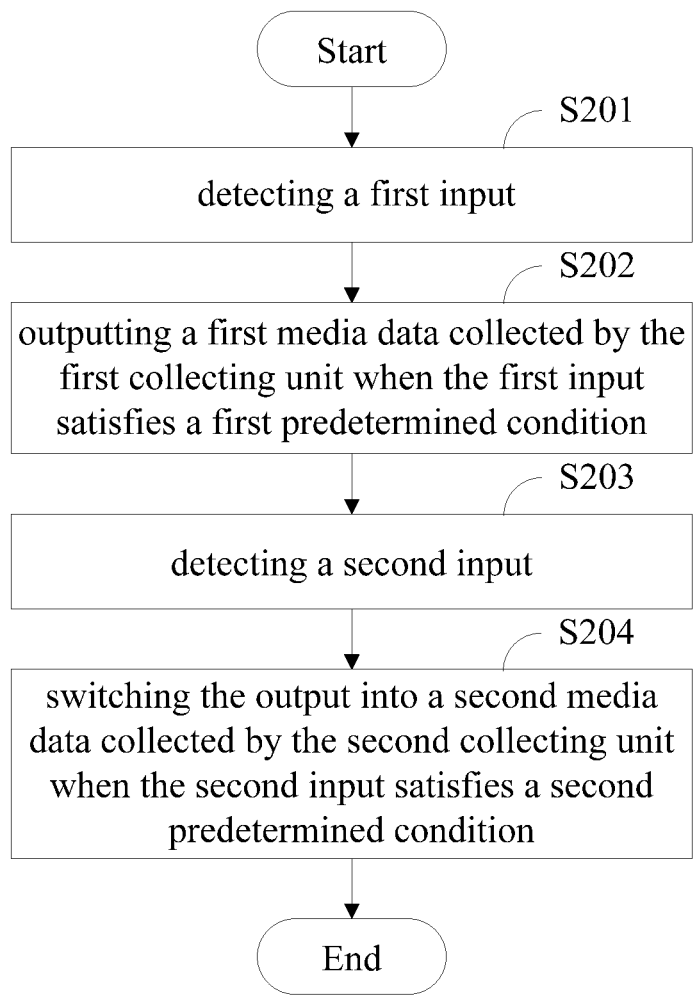
FIG. 2 is a flowchart illustrating the information processing method according to another embodiment of the present disclosure.

In the following, the information processing method according to another embodiment of the present disclosure will be described with reference to FIG. 2.

The information processing method according to the embodiment of the present disclosure also applies to the electronic device described above. As shown in FIG. 2, first, at step S201, the information processing method according to the embodiment of the present disclosure detects a first input. In particular, if the electronic device comprises the touch display screen described above, the information processing method may detect a touch input made by the user through the touch display screen.

Next, at step S202, the information processing method outputs a first media data collected by the first collecting unit when the first input satisfies a first predetermined condition. The first media data may be for example the first target media data as described with reference to FIG. 1 in the above.

In particular, in the case of video data, when the information processing method determines that the first input is an instruction for instructing to display the first video media data, the information processing method displays the first video media data through the touch display screen. In the case of audio data, when the information processing method determines that the first input is an instruction for instructing to play the first audio media data, the information processing method plays the first audio media data through the speaker.

Subsequently, at step S203, the information processing method detects a second input. And when the second input satisfies a second predetermined condition, the information processing method switches the output into a second media data collected by the second collecting unit at step S204. The second media data is for example the second target media data as described with reference to FIG. 1 in the above.

In particular, in an embodiment, when the information processing method detects that a user pushes a first predetermined software key or hardware key, it is determined that the second predetermined condition is satisfied. In another embodiment, when the information processing method detects that the second input is a first specific gesture, it is determined that the second predetermined condition is satisfied. For example, when the information processing method detects that the second input is a gesture of sliding to the left after long pushing, it is determined that the second predetermined condition is satisfied. As another example, when the information processing method detects that the second gesture is a gesture of sliding to the left slowly, it is determined the second predetermined condition is satisfied. However, the above gestures are only examples, and those skilled in the art may design other conditions as the second predetermined condition based on the above.

In addition, in another embodiment, when the electronic device outputs the first media data, the information processing method may also detect a third input, and when the third input satisfies a third predetermined condition, the output is switched into a third media data.

In particular, in an embodiment, when the information processing method detects that a user pushes a second predetermined software key or hardware key which is different from the above first predetermined software key or hardware key, it is determined that the third predetermined condition is satisfied. In another embodiment, when the information processing method detects that the third input is a second specific gesture which is different from the above first specific gesture, it is determined that the third predetermined condition is satisfied. For example, when the information processing method detects that the third gesture is a gesture of sliding to the left rapidly, it is determined the third predetermined condition is satisfied. However, the above gestures are only examples, and those skilled in the art may design other conditions as the third predetermined condition based on the above.

Further, as described with reference to FIG. 1 in the above, the first media data and the second media data have the same media type, i.e. both are an audio type, a video type or an image type. In addition, the first media data corresponds to a first collecting time parameter, the second media data corresponds to a second collecting time parameter, and the first collecting time parameter is the same as the second collecting time parameter. That is, the first media data and the second media data are collected at the same timing or in the same time period.

On the other hand, the third media data is collected by one of the first collecting unit and the second collecting unit. The third media data corresponds to the third collecting time parameter, and the third collecting time parameter is different from the first collecting time parameter and the second collecting time parameter. That is, the third media data is collected at a different time from the first media data and the second media data. In other words, the third media data is stored unassociated with the first media data and the second media data.

In another embodiment, if the first media data comprises a first image and the second media data comprises a second image, when switching the output into the second media data collected by the second collecting unit, the information processing method may generate a transitional image representing the switching of the first image to the second image before displaying the second image, and display the transitional image. Thereby, the switching of the displayed images becomes more natural so as to improve the user's experience.

More specifically, the transitional image may be a static transitional image or a dynamic transitional image reflecting the switching procedure. And the transitional image is generated by using the first image and the second image.

In the following, the generation of the transitional image will be described with reference to FIG. 3 and FIG. 4.

FIGS. 3A to 3D are display schematic diagram of the display area 300 of the electronic device to which the information processing method according to an embodiment of the present disclosure is applied. The electronic device comprises a first image collecting unit on the front surface and a second image collecting unit on the back surface (not shown) for simultaneously collecting images/videos in different directions respectively. The images/videos collected in different directions are the image 301 in FIG. 3A and the image 304 in FIG. 3D respectively.

Figure 3A:
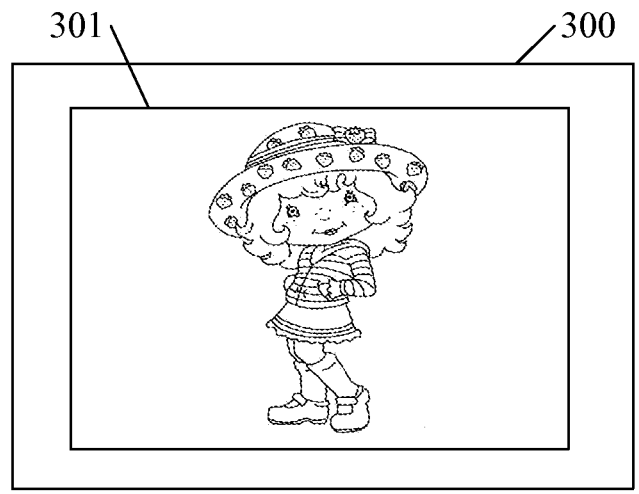
FIG. 3A is a display schematic diagram illustrating the electronic device to which the information processing method according to an embodiment of the present disclosure is applied.

As shown in FIG. 3A, when the information processing method according to an embodiment of the present disclosure detects a first input and determines that the first input satisfies the first predetermined condition, the display area 300 of the electronic device displays the first media data collected by the first collecting unit, i.e., the first image 301.

Next, when the information processing method detects a second input and determines that it satisfies the second predetermined condition, for example, when the information processing method detects a gesture of sliding to the left after a long pushing, the information processing method generates a dynamic transitional image (transitional animation) based on the first image 301 and the second image 304.

Figure 3B:
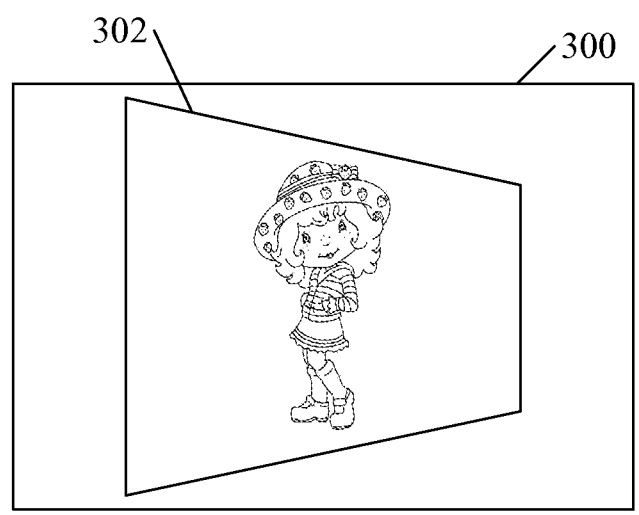
FIG. 3B is a display schematic diagram illustrating the electronic device to which the information processing method according to an embodiment of the present disclosure is applied.

In particular, the image processing method may generate a first part of the dynamic transitional image based on the first image 301, as shown by the image 302 in FIG. 3B. And, the image processing method generates a second part of the dynamic transitional image based on the second image 304, as shown by the image 303 in FIG. 3C. Subsequently, the information processing method combines the first part and the second part to generate the final transitional image.

More specifically, for example, the information processing method may firstly perform a predetermined image processing, such as size adjusting, stretching in a predetermined direction, deformation processing, or the like, on the first image 301 to obtain the first part 302 of the transitional image. Likewise, the information processing method may perform the predetermined image processing on the second image 304. It is noted that, for better display effect, the processing such as stretching or deformation performed on the second image 304 may have opposite directions to that performed on the first image 301. Therefore, the information processing method obtains the second part 303 of the transitional image. The information processing method may also add a predetermined animation between the first part 302 and the second part 303 to present a rigid turning-over effect of a double-face image.

However, the generation of the above dynamic transitional images is only an example. Those skilled in the art may of course generate dynamic or static transitional images with various formats and various display effects based on the first image 301 and the second image 304 based on the above description, which all fall into the protection scope of the present disclosure.

Figure 3C:
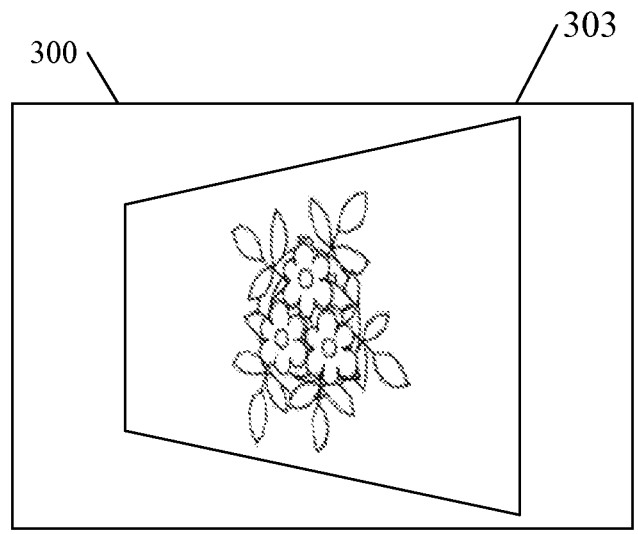
FIG. 3C is a display schematic diagram illustrating the electronic device to which the information processing method according to an embodiment of the present disclosure is applied.
Figure 3D:
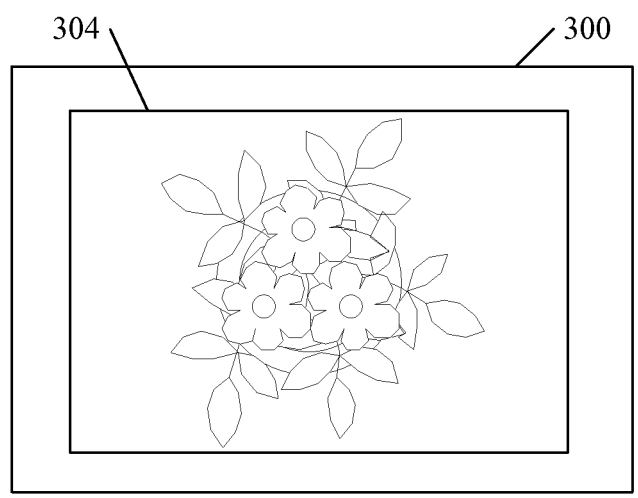
FIG. 3D is a display schematic diagram illustrating the electronic device to which the information processing method according to an embodiment of the present disclosure is applied.

After generating and sequentially displaying the transitional images as shown in FIG. 3B and FIG. 3C, the information processing method according to an embodiment of the present disclosure displays the second image collected by the second collecting unit, i.e., the second image 304 as shown in FIG. 3D. Thereby, the display is finally switched from the first image 301 to the second image 304 stored in association with the first image 301.

An example of the generation of the dynamic image is described in the above with reference to FIG. 3A to FIG. 3D. In the above example, the image (i.e. image 302) generated by performing image processing on the first image 301 and the image (i.e. image 303) generated by performing image processing on the second image 304 are not displayed on the display area 300 simultaneously, but displayed on the display area 300 in a sequence based on the turning-over direction. Alternatively, the images generated based on the first image and the second image may also displayed on the display area simultaneously.

Figure 4A:
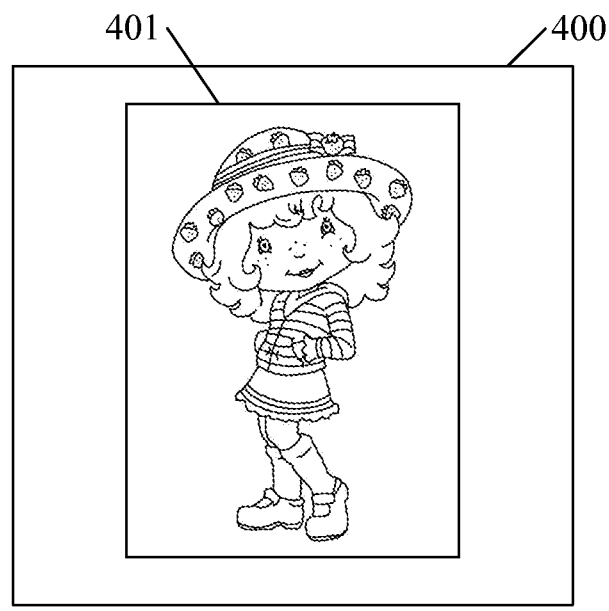
FIG. 4A is another display schematic diagram illustrating the electronic device to which the information processing method according to an embodiment of the present disclosure is applied.
Figure 4B:
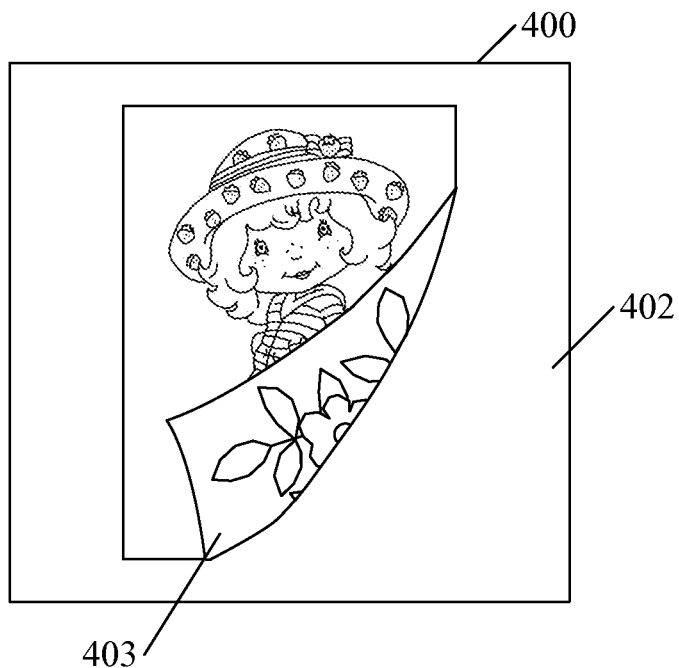
FIG. 4B is another display schematic diagram illustrating the electronic device to which the information processing method according to an embodiment of the present disclosure is applied.
Figure 4C:
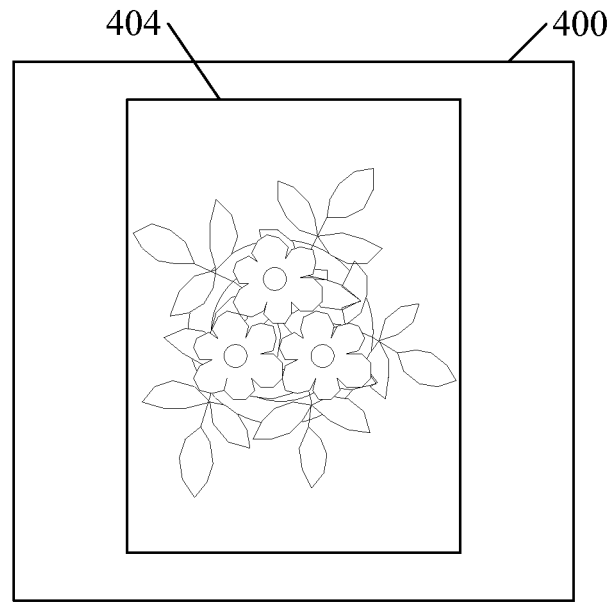
FIG. 4C is another display schematic diagram illustrating the electronic device to which the information processing method according to an embodiment of the present disclosure is applied.

FIGS. 4A to 4C are display schematic diagrams of the display area 400 of the electronic device according to an embodiment of the present disclosure. Likewise, the electronic device comprises a first image collecting unit on the front surface and a second image collecting unit on the back surface (not shown) for simultaneously collecting images/videos in different directions respectively. The images/videos collected in different directions are for example the image 401 in FIG. 4A and the image 404 in FIG. 4C respectively.

Likewise, as shown in FIG. 4A, when the information processing method according to an embodiment of the present disclosure detects a first input and determines that the first input is an input for instructing to display the first image, the display area 400 of the electronic device displays the first media data collected by the first collecting unit, i.e., the first image 401.

Next, when the information processing method detects a second input and determines that it satisfies the second predetermined condition, for example, when the information processing method detects a gesture of sliding to the left after a long pushing, the information processing method generates a dynamic transitional image (transitional animation) based on the first image 401 and the second image 404.

In particular, the information processing method may combine a part of the first image 401 with the corresponding part of the second image 404 to generate the transitional image, as shown in FIG. 4B.

More specifically, for example, the information processing method may firstly perform a predetermined image processing such as image cutting on the first image 401 to obtain the first part 402 of the transitional image. Likewise, the information processing method may perform the predetermined image processing such as image cutting on the second image 404. It is noted that, for better display effect, the part obtained by cutting the second image 404 and the part obtained by cutting the first image 401 correspond to each other. Further, in order to better present the flexible turning-over effect of a double-face image, the information processing method may perform other image processing such as deforming or stretching on the part obtained by cutting the second image 404. Thereby the information processing method obtains the second part 403 of the transitional image. Subsequently, the information processing method combines the first part 402 and the second part 403 to obtain the transitional image as shown in FIG. 4B.

The information processing method may also adjust the cutting ratio of the first image 401 and the second image 404 to generate a series of combined images such that the part from the first image in the combined image becomes smaller and smaller and the part from the second image becomes larger and larger to form the final dynamic transitional image together, so as to present the flexible turning-over effect of a double-face image.

However, the generation of the above dynamic or static transitional images is only an example. Those skilled in the art may of course generate dynamic or static transitional images with various forms based on the first image 401 and the second image 404 based on the above description, which all fall into the protection scope of the present disclosure.

After generating and sequentially displaying the transitional images as shown in FIG. 4B, the information processing method according to an embodiment of the present disclosure displays the second image collected by the second collecting unit, i.e., the second image 404 as shown in FIG. 4C. Thereby, the display is finally switched from the first image 401 to the second image 404 stored in association with the first image 401.

Further, it is noted that, in the transitional images described with reference to FIG. 3 and FIG. 4 in the above, the first collecting unit and the second collecting unit are located on the front surface and the back surface respectively, and their positions are opposite, such that the display effect of the generated transitional images reveal the turning-over effect of a double-face image. Alternatively, when the positional relationship between the first collecting unit and the second collecting unit is different from the case shown in FIG. 3 and FIG. 4, the display effect of the generated transitional images may be different. For example, when the first collecting unit and the second collecting unit are adjacent to each other, the display effect of the generated transitional images may be the translation effect of adjacent images. That is, the information processing method generates a dynamic image with a specific display effect corresponding to the positional relationship between the first surface and the second surface. Thereby, the switching display between the associated first image and second image adapts to the positional relationship between the first collecting unit and the second collecting unit, the switching procedure is more adapt to the user's recognition habit and more natural, and the user's experience is improved.

In addition, it is noted that in the case of switching the output into the third media data (e.g. the third image) in response to the third input as described in the above, the information processing method may also add a predetermined transitional media data in the switching procedure of the first media data and the third media data. For example, supposing the display effect in the switching procedure from the first image to the second image as described with reference to FIG. 3 and FIG. 4 in the above is a first effect, the information processing method switches the first image into the third image with an effect different from the first effect. For example, the information processing method may perform switching with an effect of translating rather than turning over the first image into the third mage. However, the above second effect is only an example, and those skilled in the art may of course switch the first image into the third image with other effects.

Thereby, the information processing method according to an embodiment of the present disclosure distinguishes the display effect of the switching procedure from the first image to the second image associated with it from that of the switching procedure from the first image to the third image unassociated with it, enabling the user to better experience and recognize the associated or unassociated images, which improves the user's experience.

In addition, it is noted that the above description is mainly made by taking the display effect of the switching of the static images as examples. Those skilled in the art shall recognize that the display effect of the information processing method according to embodiments of the present disclosure may apply to the switching of dynamic images (video) or even audio. For example, the information processing method may take one frame of the video as a representative frame to generate the above transitional image with a specific display effect. As another example, the information processing method may generate a transitional image with a specific display effect based on images containing parameter information such as name, length, etc. of the video or audio.

In the above, the information processing method according to embodiments of the present disclosure is described with reference to FIG. 2 to FIG. 4. In the information processing method according to embodiments of the present disclosure, it is enabled to make full use of the collecting capability of multiple collecting units and restore and present the surrounding environment more sufficiently by performing collection on the surrounding environment with multiple collecting units of the electronic device simultaneously and storing the simultaneously obtained multiple collecting results in association with one another.

Further, in the information processing method according to embodiments of the present disclosure, the obtained collecting results are presented in a manner adapted to the user's recognition habit and operation habit, which enables the user to perform switching with a natural and simple gesture. Therefore, a new collecting and storage manner for the electronic device is provided to enrich the user's experience. In the following, the information processing device according to an embodiment of the present disclosure will be described with reference to FIG. 5 and FIG. 6.

Figure 5:
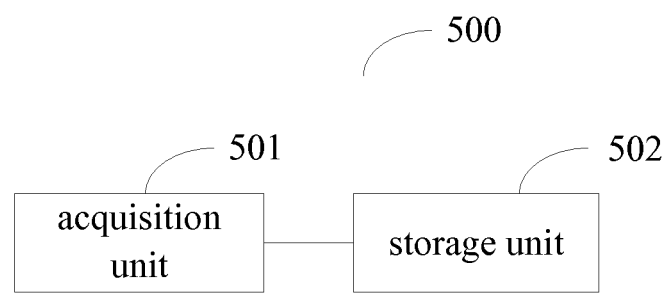
FIG. 5 is a block diagram illustrating the main configuration of the information processing device according to an embodiment of the present disclosure.

FIG. 5 is a block diagram illustrating the main configuration of the information processing device according to an embodiment of the present disclosure.

The information processing device according to the embodiment of the present disclosure is applied to an electronic device, and the electronic device comprises a first collecting unit located on a first surface and a second collecting unit located on a second surface.

As shown in FIG. 5, the information processing device 500 according to the embodiment of the present disclosure comprises an acquisition unit 501 and a storage unit 502.

The acquisition unit 501 is configured to acquire a first source data by the first collecting unit while acquire a second source data by the second collecting unit. The storage unit 502 is configured to store a first target data based on the first source data and a second target data based on the second source data in association with each other.

When the electronic device outputs the first target data, it may switch the output into the second target data in response to a second input satisfying a second predetermined condition, or it may switch the output into a third target data which is not associated with the first target data and the second target data in response to a third input satisfying a third condition.

Figure 6:
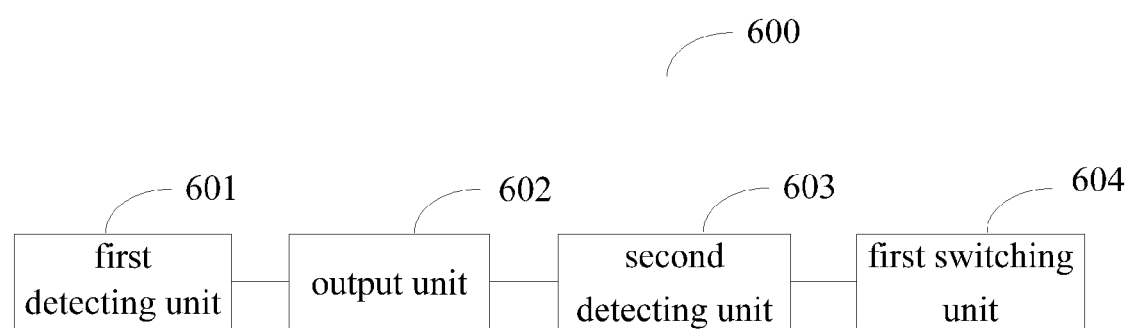
FIG. 6 is a block diagram illustrating the main configuration of the information processing device according to another embodiment of the present disclosure.

FIG. 6 is a block diagram illustrating the main configuration of the information processing device according to another embodiment of the present disclosure.

The information processing device according to the embodiment of the present disclosure is also applied to an electronic device, and the electronic device comprises a first collecting unit located on a first surface and a second collecting unit located on a second surface.

As shown in FIG. 6, the information processing device 600 according to the embodiment of the present disclosure comprises a first detecting unit 601, an output unit 602, a second detecting unit 603, and a first switching unit 604.

The first detecting unit 601 is configured to detect a first input. The output unit 602 is configured to output a first media data collected by the first collecting unit when the first input satisfies a first predetermined condition. The second detecting unit 603 is configured to detect a second input. The first switching unit 604 is configured to switch the output into a second media data collected by the second collecting unit when the second input satisfies a second predetermined condition.

The first media data and the second media data have the same media type, the first media data corresponds to a first collecting time parameter, the second media data corresponds to a second collecting time parameter, and the first collecting time parameter is the same as the second collecting time parameter.

In one embodiment, the first media data comprises a first image, and the second media data comprises a second image. The first switching unit 604 comprises: a generation unit configured to generate a transitional image representing the switching of the first image to the second image before displaying the second image; and a display unit configured to display the transitional image.

In another embodiment, the generation unit is configured to generate a static transitional image or a dynamic transitional image based on the first image and the second image.

In another embodiment, the generation unit is configured to generate the transitional image with a specific display effect corresponding to the positional relationship between the first surface and the second surface.

In another embodiment, the information processing device 600 further comprises: a third detecting unit configured to detect a third input; and a second switching unit configured to switch the output into a third media data when the third input satisfies a third predetermined condition; wherein the third media data is collected by one of the first collecting unit and the second collecting unit, the third media data corresponds to a third collecting time parameter which is different from the first collecting time parameter and the second collecting time parameter.

In another embodiment, the first switching unit 604 is configured to switch the output into the second media data with a first effect; and the second switching unit is configured to switch the output into the third media data with a second effect which is different from the first effect.

In the above, the information processing device according to embodiments of the present disclosure is described with reference to FIG. 5 and FIG. 6. In the information processing device according to the embodiments of the present disclosure, it is enabled to make full use of the collecting capability of multiple collecting units and restore and present the surrounding environment more sufficiently by performing collection on the surrounding environment with multiple collecting units of the electronic device simultaneously and storing the simultaneously obtained multiple collecting results in association with one another.

Further, in the information processing device according to the embodiments of the present disclosure, the obtained collecting results are presented in a manner adapted to the user's recognition habit and operation habit, which enables the user to perform switching with a natural and simple gesture. Therefore, a new collecting and storage manner for the electronic device is provided to enrich the user's experience.

In the above, an information processing device and an information processing method according the embodiments of the present disclosure are described with respect to FIG. 1 to FIG. 6.

It is noted that, in the specification, the term of "comprise", "include" or the like is not meant to be exclusive such that a process, method, article or device comprising a series of elements includes not only those elements but may also include other elements not explicitly listed, or may also include native elements of such a process, method, article or device. Without more limits, the sentence defining an element by "comprising a . . . " does not exclude the existence of other identical elements in the process, method, article or device comprising the element.

In addition, it is noted that, in the specification, the expressions like "first . . . unit" or "second . . . unit" are only for facilitate distinguishing them when making description, but do not mean that they must be implemented as two or more units physically separated. In fact, as required, the units may be implemented as one unit or multiple units.

Finally, it is noted that the above series of processes include not only the processes performed in time sequence described herein, but also the processes performed in parallel or respectively rather than in time sequence.

With the description of the above embodiments, those skilled in the art shall clearly realize that the present disclosure may be implemented by software in combination with necessary hardware platforms, or entirely by hardware. Based on such understanding, all or part of the solutions of the present disclosure distinguished from the prior art may be embodied in the form of software product. The computer software product may be stored in a storage medium such as ROM/RAM, magnetic disk, optical disk, etc., and include instructions for causing a computer device (which may be a personal computer, a server, or a network device) to implement the methods described in each embodiment or described in some part of each embodiment.

In the embodiments of the present disclosure, the units/modules may be implemented by software to be executed by various processors. For example, an identified executable code module may include one or more physical or logical blocks of computer instructions. For example, it may be constructed as an object, process or function. However, the executable codes of the identified module do not have to be located together physically, but may comprise different instructions stored in different locations. When the instructions are combined together logically, they constitute units/modules and realize the specified objects of the units/modules.

While the units/modules can be implemented by software, considering the current level of the hardware process, for all the units/modules implementable by software, those skilled in the art may setup corresponding hardware circuits to realize corresponding functions if the cost is not under consideration. The hardware circuits may include normal Very Large Scale Integration (VLSI) circuits or gate arrays and existing semiconductor or other discrete components such as logical chips and transistors. The module may also be implemented by programmable hardware devices, such as Field Programmable Gate Array (FPGA), Programmable Array Logic (PAL), Programmable Logic Device (PLD), etc.

The present disclosure has been described in detail in the above. In the specification, specific examples are employed to explain the principle and embodiments of the present disclosure, and the description of the above embodiments are only to facilitate understanding the methods and core concepts of the present disclosure. In addition, those skilled in the art would make alternations to the specific embodiments and the application ranges according to the concepts. In conclusion, the content of the specification should not be considered as limiting of the present disclosure.

The invention claimed is:

1. An information processing method applied to an electronic device that includes a first collecting unit located on a first surface and a second collecting unit located on a second surface, the information processing method comprising:

detecting, in a first detecting unit using a processor, a first input;

outputting a first media data collected by the first collecting unit when the first input satisfies a first predetermined condition;

detecting, in a second detecting unit using a processor, a second input; and switching, in a first switching unit using a processor the output into a second media data collected by the second collecting unit when the second input satisfies a second predetermined condition, wherein the first media data and the second media data have the same media type, the first media data corresponds to a first collecting time parameter, the second media data corresponds to a second collecting time parameter, and the first collecting time parameter is the same as the second collecting time parameter, and wherein the first media data comprises a first image, the second media data comprises a second image, and the step of switching the output into the second media data collected by the second collecting unit comprises generating a transitional image representing the switching of the first image to the second image before displaying the second image; and displaying the transitional image, and the step of generating the transitional image comprises generating a static transitional image or a dynamic transitional image based on the first image and the second image and, wherein the step of generating the transitional image comprises generating the transitional image with a specific display effect corresponding to the positional relationship between the first surface and the second surface.

2. An information processing method applied to an electronic device comprising a first collecting unit located on a first surface and a second collecting unit located on a second surface, the information processing method comprising:
 detecting, in a first detecting unit using a processor, a first input;
 outputting a first media data collected by the first collecting unit when the first input satisfies a first predetermined condition;
 detecting, in a second detecting unit using a processor, a second input; and
 switching, in a first switching unit using a processor, the output into a second media data collected by the second collecting unit when the second input satisfies a second predetermined condition,
 wherein the first media data and the second media data have the same media type, the first media data corresponds to a first collecting time parameter, the second media data corresponds to a second collecting time parameter, and the first collecting time parameter is the same as the second collecting time parameter,
 wherein the first media data comprises a first audio, and the second media data comprises a second audio;
 the first collecting unit performs collection on the sound environment surrounding the electronic device to obtain a first processing audio, the second collecting unit performs collection on the sound environment surrounding the electronic device to obtain a second processing audio, the first audio is obtained through performing noise-reduction processing on the first processing audio by taking the second processing audio as noise, and the second audio is obtained through performing noise-reduction processing on the second processing audio by taking the first processing audio as noise.

3. An information processing method applied to an electronic device comprising a first collecting unit located on a first surface and a second collecting unit located on a second surface, the information processing method comprising:
 detecting, in a first detecting unit using a processor, a first input;
 outputting a first media data collected by the first collecting unit when the first input satisfies a first predetermined condition;
 detecting, in a second detecting unit using a processor, a second input; and
 switching, in a first switching unit using a processor, the output into a second media data collected by the second collecting unit when the second input satisfies a second predetermined condition;
 detecting, in a third detecting unit using a processor, a third input; and
 switching, in a second switching unit using a processor, the output into a third media data when the third input satisfies a third predetermined condition,
 wherein the first media data and the second media data have the same media type, the first media data corresponds to a first collecting time parameter, the second media data corresponds to a second collecting time parameter, and the first collecting time parameter is the same as the second collecting time parameter,
 the third media data is collected by one of the first collecting unit and the second collecting unit, the third media data corresponds to a third collecting time parameter which is different from the first collecting time parameter and the second collecting time parameter; and
 the step of switching the output into the second media data collected by the second collecting unit comprises:
 switching the output into the second media data with a first effect;
 and the step of switching the output into the third media data comprises:
 switching the output into the third media data with a second effect which is different from the first effect.

4. An information processing device applied to an electronic device comprising a first collecting unit located on a first surface and a second collecting unit located on a second surface, the information processing device comprising:
 a first detecting unit using a processor and configured to detect a first input:
 an output unit configured to output a first media data collected by the first collecting unit when the first input satisfies a first predetermined condition:
 a second detecting unit using a processor and configured to detect a second input; and
 a first switching unit using a processor and configured to switch the output into a second media data collected by the second collecting unit when the second input satisfies a second predetermined condition,
 wherein the first media data and the second media data have the same media type, the first media data corresponds to a first collecting time parameter, the second media data corresponds to a second collecting time parameter, and the first collecting time parameter is the same as the second collecting time parameter,
 the first media data comprises a first image, the second media data comprises a second image, and the first switching unit comprises:
 a generation unit configured to generate a transitional image representing the switching of the first image to the second image before displaying the second image; and
 a display unit configured to display the transitional image; and
 wherein the generation unit is configured to generate the transitional image with a specific display effect corresponding to the positional relationship between the first surface and the second surface.

5. An information processing device applied to an electronic device comprising a first collecting unit located on a first surface and a second collecting unit located on a second surface, the information processing device comprising:
 a first detecting unit using a processor and configured to detect a first input;
 an output unit configured to output a first media data collected by the first collecting unit when the first input satisfies a first predetermined condition;
 a second detecting unit using a processor and configured to detect a second input; and
 a first switching unit using a processor and configured to switch the output into a second media data collected by the second collecting unit when the second input satisfies a second predetermined condition;
 a third detecting unit using a processor and configured to detect a third input; and
 a second switching unit using a processor and configured to switch the output into a third media data when the third input satisfies a third predetermined condition,
 wherein the first media data and the second media data have the same media type, the first media data corresponds to a first collecting time parameter, the second media data corresponds to a second collecting time parameter, and the first collecting time parameter is the same as the second collecting time parameter,
 the third media data is collected by one of the first collecting unit and the second collecting unit, the third media data corresponds to a third collecting time parameter which is different from the first collecting time parameter and the second collecting time parameter, the first media data comprises a first image, the second media data comprises a second image, and the first switching unit comprises:

a generation unit configured to generate a transitional image representing the switching of the first image to the second image before displaying the second image; and a display unit configured to display the transitional image; and wherein the first switching unit is configured to switch the output into the second media data with a first effect; and the second switching unit is configured to switch the output into the third media data with a second effect which is different from the first effect.

* * * * *